UNITED STATES PATENT OFFICE 2,605,257

INTERPOLYMERS OF VINYL CHLORIDE, ALKYL ACRYLATE, AND STYRENE

Robert J. Wolf and Anthony A. Nicolay, Cleveland, Ohio, assignors to The B. F. Goodrich Company, New York, N. Y., a corporation of New York No Drawing. Application May 20, 1950, Serial No. 163,335

5 Claims. (Cl. 260—80.5)

The present invention relates to interpolymers obtained by the polymerization of monomeric mixtures containing at least three monomeric components, each in particular proportion, one of which is vinyl chloride, another of which is styrene, and the third of which is an alkyl acrylate particularly an octyl acrylate.

The copolymers of vinyl chloride and the alkyl acrylates are well known to the art. The copolymers of vinyl chloride and styrene, on the other hand, have not been so known, nor have they been used to any great extent. The reason lies in the inherent difficulty in achieving a true copolymerization reaction between the latter two monomers. Attempts to copolymerize vinyl chloride and styrene have always resulted in a hard, brittle, relatively useless material which even when plasticized cannot be formed into clear plastic sheets or molded articles because of the presence therein of polyvinyl chloride and polystyrene which are incompatible with each other. In the copending application of Harold Tucker, Serial No. 84,751, filed March 31, 1949, it is disclosed that the copolymerization of vinyl chloride and styrene by usual methods results in a mixture of polyvinyl chloride, polystyrene, and perhaps some vinyl chloride styrene copolymer and that only by careful and exacting technique comprising proportional addition of vinyl chloride and styrene to a reaction medium containing certain powerful catalysts is it possible to obtain a true copolymer free of polyvinyl chloride and polystyrene. The vinyl chloride styrene copolymer thus obtained, however, requires the addition of plasticizer for use in most processing operations.

We have now discovered that the usual difficulties attendant on achieving copolymerization between vinyl chloride and styrene may be eliminated and excellent interpolymers containing interpolymerized vinyl chloride and styrene (that is, free from polyvinyl chloride and polystyrene) obtained without the use of special techniques if one or more alkyl acrylates are added to the monomeric mixture of vinyl chloride and styrene before or during polymerization. The presence of the third monomer, an alkyl acrylate, causes a smooth reaction to occur, in which vinyl chloride, styrene, and the alkyl acrylate combine to form interpolymers having new and unique properties quite unlike the properties of the copolymers of any two monomers of the mixture.

Other monoolefinic monomeric materials may also be present in the monomeric mixture, along with the vinyl chloride, styrene, and alkyl acrylate. Such monomers include, for example, acrylonitrile, methacrylonitrile, vinylidene chloride, vinyl acetate, vinyl benzoate, alkyl esters of an alpha-alkyl acrylic acid such as methyl methacrylate, isobutylene and others. One or more of these other monomeric materials may be utilized in amounts totalling up to 10% of the monomeric mixture. However, since the tripolymers made from mixtures containing only vinyl chloride, styrene and an alkyl acrylate are superior in clarity and strength to the multipolymers containing one or more of the above additional monomers, it is preferred that only the three specified types of monomers be present in the reaction mixture.

The relative proportions of monomers which are employed in the production of our interpolymers are somewhat critical since desirable properties are not secured with the three types of monomers in any proportion, but the proportions may vary within certain limits. In the monomeric mixture we have found it necessary to employ from 35 to 90% by weight of vinyl chloride, from 5 to 60% by weight of the alkyl acrylate, and from 5 to 50% by weight of styrene with at least 90% by weight of the monomeric mixtures made up of these three specified ingredients; particularly valuable are those interpolymers made from monomeric mixtures consisting of from 40 to 85% by weight of vinyl chloride, from 10 to 50% of the alkyl acrylate, and from 5 to 35% styrene.

Any of the alkyl esters of acrylic acid may be employed as the third component of the monomeric mixture. Among these are methyl, ethyl, propyl, butyl, amyl, hexyl, heptyl, octyl, nonyl, isononyl, decyl, and even higher alkyl acrylates. We have found that the acrylates particularly preferred are the higher alkyl acrylates in which the alkyl group contains from five to ten carbon atoms, the members of this class forming particularly valuable interpolymers with vinyl chloride and styrene all of which are processable without the addition of plasticizers even though they range from soft and flexible materials to materials which are relatively hard and stiff. We have found that the degree of plasticity or inherent processability imparted to our new interpolymers by the higher alkyl acrylates is largely determined by the length and configuration of the alkyl group in the alkyl acrylate and that this finding corresponds roughly with the observed degree of plasticization imparted to ordinary vinyl resins by extraneous addition of ester type plasticizer containing similar alkyl groups.

For example, di-2-ethylhexyl phthalate is an excellent plasticizer for vinyl chloride polymers, and 2-ethylhexyl acrylate has been found to impart an excellent degree of inherent processability to its interpolymers with vinyl chloride and styrene. Illustrative higher alkyl acrylates within the preferred class utilizable in this invention include n-amyl acrylate, n-hexyl acrylate, the isohexyl acrylates, n-heptyl acrylate, isoheptyl acrylates, capryl acrylate (1-methyl heptyl acrylate) n-octyl acrylate, the isooctyl acrylates such as 6-methyl heptyl acrylate, n-nonyl acrylate, the isononyl acrylates such as 3,5,5-trimethylhexyl acrylate, n-decyl acrylate, and others.

It is especially preferred to employ higher alkyl acrylates in which the alkyl group contains a total of 8 to 10 carbon atoms, and possesses a carbon chain of from 6 to 10 atoms. Compounds within this class are 6-methyl heptyl acrylate (isooctyl acrylate) 3,5,5-trimethylhexyl acrylate, 2-ethylhexyl acrylate, capryl acrylate (1-methyl heptyl acrylate), n-octyl acrylate and others. The higher alkyl acrylates of this class have been found to impart the greatest ease of processing and greatest softness and flexibility to our new interpolymers, n-octyl acrylate being the most proficient acrylate in this respect.

The polymerization of our new interpolymers may be carried out in any conventional manner, although polymerization in aqueous emulsion is of course essential when a latex of the interpolymer is the desired end product. In addition to this preferred method, the mixture of monomers may be polymerized in solution in a suitable solvent for the monomer, or in the absence of solvent or diluent. Interpolymers in the form of fine granules are also secured by the so-called "pearl" type polymerization method in which the monomers are polymerized in aqueous suspension in the presence of a colloidal material such as gelatin, bentonite clay, polyvinyl alcohol, polyacrylic acid, or the like.

Irrespective of the method of polymerization employed, the catalyst may be any of the catalysts commonly employed for the polymerization of vinyl and vinylidene compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl di-perphthalate, tertiary butyl perbenzoate, sodium, potassium and ammonium persulfate, sodium perborate, sodium percarbonate, and others.

The above class of catalysts are greatly activated when used in combination with a reducing substance such as sodium thiosulfate, sodium sulfite, a polyhydroxy phenol, etc., in what is commonly referred to as a "Redox" polymerization. Both the peroxygen compounds and their Redox combinations with various reducing substances are also greatly activated by the presence of a small amount of a soluble, heavy metal salt such as silver nitrate, copper sulfate, ferric and cobalt compounds and many others.

In some instances it may be desirable to control or adjust the hydrogen ion concentration of the reaction mixture, which tends to become more acid because of liberation of HCl during the polymerization. It is generally preferred, therefore, that a buffering agent be added to the reaction mixture. For this purpose sodium bicarbonate, sodium carbonate, ammonium bicarbonate, ammonium hydroxide, sodium hydroxide, the amino-substituted alcohols, such as 2-amino-2-methyl-1-propanol, and others are suitable.

Any of the usual emulsifying agents may be employed when the polymerization is carried out in aqueous emulsion. Ordinary soaps such as the alkali metal, ammonium and alkanol-amine salts of fatty acids, including sodium oleate, sodium myristate, potassium palmitate, ammonium stearate, ethanol amine laurate, and the like, as well as rosin or dehydrogenated rosin acid soaps may be employed, but more useful latices are secured with the synthetic saponaceous materials including hymolal sulfates and sulfonates, such as sodium lauryl sulfate, sodium cetyl sulfate, the sodium salt of sulfonated paraffin oil, the sodium salt of dodecane-1-sulfonic acid, octadecane-1-sulfonic acid, etc.; alkaryl sulfonates such as sodium alkyl benzene sulfonates, sodium isopropyl naphthalene sulfonate, sodium isobutyl naphthalene sulfonate, and the like; and alkali metal salts of sulfonated dicarboxylic acid esters and amides such as sodium dioctyl sulfosuccinate, sodium-N-octadecyl-sulfosuccinamate, the sodium salt of n-octadecyl-N (1,2-dicarboxyethyl) sulfosuccinamate and the like; and salts of organic bases containing long carbon chains, for example, the hydrochloride of diethyloleylamide, lauryl amine hydrochloride, trimethyl cetyl ammonium bromide, and the like. Salts of organic bases (also called anionic soaps) yield acetic emulsions and ordinary fatty acid soaps yield alkaline emulsions, whereas the hymolal sulfates and sulfonates which are particularly preferred, may be utilized in emulsions over a wide pH range.

While the polymerization of the monomeric mixture of this invention may be carried out in the presence of air, the rate of reaction is ordinarily faster in the absence of oxygen, and hence polymerization in an evacuated vessel or under an inert atmosphere is preferred. The temperature at which the polymerization is carried out is not critical. It may vary widely from −30 to 100° C. or higher, though best results are generally obtained at a temperature of about 0° C. to about 70° C.

In order to minimize variation in the rate of reaction and to obtain greater homogeneity in the products, it may sometimes be desirable to withhold a portion or all of one or more of the monomeric materials, and add the withheld portion in increments or continuously over the reaction period. An entirely satisfactory method is to premix the monomeric materials, which in the pure state have little tendency to spontaneously copolymerize, and add small increments of the mixture or add the mixture in a continuous manner to the reaction vessel over the course of the reaction. The polymerization in aqueous emulsion also may be effected in the presence of a small amount of a seed latex in order to obtain larger latex particles and greater fluidity for given latex solids content. If the amount of the emulsifier in the aqueous emulsion is carefully controlled during the reaction at somewhat less than the amount theoretically necessary to provide a monomolecular film of emulsifier on the latex particles, the initiation of new particles will be suppressed, and the growth of larger particles favored. By these latter methods a latex of the interpolymers may be produced having high fluidity and over 50% total solids content, properties greatly desired in a latex for use as such in coating, impregnating and dipping processes, and in the casting of unsupported film.

The preparation of the interpolymers of this invention, their properties, and their use in representative applications will be more clearly described in the following specific examples which are intended merely as illustrations of the nature of our invention, and not as limitations on the scope thereof.

*Example 1*

A tripolymer was prepared by the polymerization of the monomeric materials contained in the reaction mixture having the following proportions:

| Material | Parts by weight |
| --- | --- |
| Vinyl Chloride | 57.0 |
| Isooctyl Acrylate | 33.0 |
| Styrene | 10.0 |
| Potassium Persulfate | 1.0 |
| Emulsifier [1] | 4.0 |
| NH$_3$ | 0.2 |
| Water (Distilled) | 94.8 |

[1] Sodium salt of a sulfonated petroleum fraction known commercially as "Duponol 189 S".

The water, emulsifying agent, and potassium persulfate were added to the reaction vessel and the vessel then sealed and evacuated. The ammonia and monomers were then added and the contents of the reaction vessel heated to 50° C. with constant agitation. In about 20 hours the reaction had reached a yield of about 95%. The product was a stable, very white appearing latex, having a total solids content of 50%.

The latex was coagulated by the salt-acid method, and a fine granular coagulum was obtained. The coagulum was dried at a temperature of 80–100° C. The dry granular polymer was found to band into a smooth clear sheet on a plastic roll mill, the rolls of which were maintained at only 180° F. without the addition of plasticizer, and without sticking of the plastic to the rolls. The tripolymer sheet was soft (90 Durometer A at 30° C.) and was very flexible. The sheet, moreover, had a dry feel and was free of tack or stickiness.

The tripolymer of Example 1 was mixed on a plastic roll mill with a 2% by weight of the resin of the mixed barium and cadmium salts of naphthenic acids, and a disc 3" wide and $\frac{1}{16}$" thickness prepared by press molding for one minute at 140° C. at 2000 lbs./sq. in. pressure. The tripolymer was found to fuse readily and flow sufficiently to completely fill the mold and form a completely fused disc having smooth edges. The disc was clear, colorless, and extremely flexible. Determination of the physical properties of the tripolymer performed on a similarly press molded test strip revealed a tensile strength of 2000 lbs./sq. in., an elongation of 225%, and a modulus at 100% elongation of 1300 lbs./sq. in.

*Example 2*

A tripolymer was prepared by polymerizing the monomeric materials in a reaction mixture having the following proportions:

| Material | Parts by Weight |
| --- | --- |
| Vinyl Chloride | 45.0 |
| 2-Ethylhexyl Acrylate | 40.0 |
| Styrene | 15.0 |
| Potassium Persulfate | 1.5 |
| NH$_3$ | 0.2 |
| Emulsifier (same as Example 1) | 4.0 |
| Water (distilled) | 94.3 |

The reaction mixture was agitated at 45° C. for 27 hours to obtain a yield of 90% of tripolymer. A portion of the latex was frozen to recover the tripolymer in granular form.

The tripolymer of Example 2 was similar to that of Example 1. It formed water-white sheets when milled without plasticizer using mill roll temperatures of only 170° F. The milled sheet was slightly softer than that of Example 1 (65 Durometer A), had a brittleness temperature of −20° F., and formed a molded disc (when molded one minute at 130° C.) which was completely fused, clear, and very flexible. The tripolymer was very soluble, forming a clear, water-like, high solids solution in tetrahydrofuran.

The latex obtained in Example 2, when coated on a clean glass plate and heated for 2 minutes at 150° C., formed an excellent, clear film which was easily stripped from the plate. The film had a tensile strength of 1950 lbs./sq. in., an elongation of 275%, and a Graves tear strength of 396 lbs./in. The film exhibited excellent heat resistance as shown by the slope of the curve of percent light transmission plotted against time of heating at 150° C. By this method the tripolymer of this Example 2 had a slope of −0.47 as compared to −0.48 for a film similarly prepared from a 80 vinyl chloride 2 methyl acrylate copolymer latex containing 35 parts/100 parts of dry copolymer solids of di-2-ethylhexyl phthalate plasticizer.

*Example 3*

Other tripolymers were prepared by the polymerization at 50° C. of a mixture consisting of 45% vinyl chloride, 35% 2-ethylhexyl acrylate, and 20% styrene, and of a mixture consisting of 40% vinyl chloride, 30% 2-ethylhexyl acrylate and 30% styrene in a reaction mixture similar to that of Example 2. The tripolymers were obtained in the form of latices containing in excess of 50% total solids. The solid tripolymers had hardness values, respectively, of 60 and 70A and could be easily molded in 1 minute at 140° C. under 2000 lbs./sq. in. to form completely fused discs or sheets. The light and heat stability of the tripolymers may be shown by a test consisting of coating a clean glass microscope slide with the polymer, exposing the coating to prolonged heating or to prolonged exposure to ultraviolet light, and measuring the light transmitted through the coating before and after exposure (the ratio of the light transmitted after exposure to that before, expressed in percent being taken as an indication of the stability of the polymer coating). The light stability of the tripolymers after exposure to ultraviolet light for four hours ranged from 90 to 97% and the heat stability after being heated for 24 hrs. at 175° C. in air ranged from 71 to 79%.

The tripolymers of Examples 2 and 3 were used in the form of the latices with the addition of only 1 or 2% by weight of a thickening agent such as carboxy ethyl cellulose to deposit thick, glossy coatings on paper, leather, fabric or woven Fiberglas, and heavy duck fabric. The coated articles were exceedingly resistant to the action of water and oil, and had a good resistance to the transmission of gases and moisture vapor. Since these tripolymers formed excellent water-like solutions (up to 20 to 25% total resin content) in tetrahydrofuran and other common solvents, they were found to be particularly adapted for use in the form of cements for coating, dipping and impregnating applications.

Example 4

A tripolymer was prepared by the polymerization of the monomeric materials contained in the following reaction mixture:

| Material | Parts by Weight |
| --- | --- |
| Vinyl Chloride | 65.0 |
| 2-Ethylhexyl Acrylate | 20.0 |
| Styrene | 15.0 |
| Potassium Persulfate | 1.7 |
| Emulsifier (same as Example 1) | 4.0 |
| $NH_3$ | 0.2 |
| Water | 94.8 |

The reaction was substantially complete in 35½ hours at 50° C. with constant agitation. The resulting tripolymer latex contained 53.8% total solids, but was fairly fluid and stable on storage. The heat stability or per cent light transmission of a film cast from a tetrahydrofuran solution of the polymer after heating 24 hours at 175° C. in an air oven was 77%, and the light stability or per cent light transmission after exposure of 4 hours to a powerful ultraviolet light was 89%. The tripolymer latex cast on an endless stainless steel belt and dried for three minutes at 150° C. was clear, smooth and flexible, tack-free, and exceedingly strong. The film was made into transparent or translucent shower curtains, raincoats, umbrellas, etc., which outlasted several similar articles made of plasticized vinyl resin. Because this tripolymer required no plasticizer, the latex or cement cast films did not stiffen, even when agitated for several weeks in warm soapy water at 180° F.

Example 5

A tripolymer was prepared by the polymerization of the monomeric materials contained in the following reaction mixture:

| Materials | Parts by Weight |
| --- | --- |
| Vinyl Chloride | 75.0 |
| 2-Ethylhexyl Acrylate | 20.0 |
| Styrene | 5.0 |
| Potassium Persulfate | 0.5 |
| Emulsifier (same as Example 1) | 4.0 |
| $NH_3$ | 0.2 |
| Water | 95.3 |

The reaction was complete in 36 hours at 45° C. with the production of an excellent medium-particle size latex. The latex formed good films when heated at 100° C., and excellent films when heated to 150° C.

The coagulated tripolymer of Example 5 could be milled at only 180° F. without plasticizer. By contrast mill plasticization and mixing of polyvinyl chloride must be carried out at 280° or higher in order to obtain a smooth homogeneous sheet. When dissolved in tetrahydrofurfuran the tripolymer formed a clear water-like solution. From this solution a clear film was cast having a per cent light transmission after exposure to ultraviolet light for 4 hours of 68% and a per cent light transmission after heating 24 hours at 175° C. of 86%.

Example 6

A tripolymer made from a mixture consisting of 80% vinyl chloride, 10% n-octyl acrylate and 10% styrene was a relatively hard material (60 Durometer C at 30° C.) but required mill roll temperatures of only 200° F. for milling, was extruded without the addition of plasticizer in an extruder having an unheated screw, a back-cylinder temperature of 200° F. and a die temperature of 250° F. The warm milled tripolymer sheet was transferred to a four roll calender having all four rolls maintained at 250° F. and a smooth, clear sheet of 10 mils thickness obtained. By contrast, plasticized polyvinyl chloride of equivalent hardness is very difficult to mill, extrude or calender, and even much softer forms of plasticized polyvinyl chloride require milling temperatures of 280° F., extruding temperatures of 340 to 390° F. and calendering temperatures of about 350° F.

Example 7

A tripolymer was prepared by subjecting the following reaction mixture to polymerizing conditions at 50° C.:

| Materials | Parts by Weight |
| --- | --- |
| Vinyl Chloride | 50.0 |
| 3,5,5-Trimethylhexyl Acrylate | 30.0 |
| Octadecyl Acrylate | 10.0 |
| Styrene | 10.0 |
| Potassium Persulfate | 1.2 |
| Emulsifier (same as Example 1) | 4.0 |
| $NH_3$ | 0.2 |
| Water | 94.6 |

The product was a latex containing 50% total solids. After coagulation and drying the pulverulent tripolymer was milled on a cool mill (180° F.) to form a smooth, clear sheet without the addition of plasticizer. A press molded disc (molded one minute at 150° C.) was completely fused, clear and flexible. A film of the tripolymer cast from a tetrahydrofuran solution had a heat stability of 62% and a light stability of 93%.

Example 8

A tripolymer made from a monomeric mixture consisting of 55% vinyl chloride, 40% 2-ethylhexyl acrylate and 5% styrene (utilizing a reaction recipe similar to that of Example 5) had a hardness of 66 Durometer A and when tested by the Clash-Berg flexibility test, which measures the temperature at which a sample of polymer composition under torsion exhibits a given degree of flexibility (in this case 135,000 lbs./sq. in. at $T_f$), showed a flexibility temperature of —32.5° C. A high-grade polyvinyl chloride plasticized with 50 parts per 100 parts of resin of di-2-ethylhexyl phthalate has a flexibility temperature of only —22.5° C. under the same torsional loading.

Example 9

The preceding examples have demonstrated the use of the preferred class of higher alkyl acrylates, however, the lower alkyl acrylates may also be used with advantages over vinyl chloride styrene two component polymers. A mixture consisting of 50% by weight vinyl chloride, 40% by weight of ethyl acrylate, and 10% styrene was polymerized in the persulfate catalyzed system of Example 1. A fluid latex of 50% total solids content was obtained. A tripolymer was a hard material though it was quite clear and flexible. A mixture consisting of 50% by weight of vinyl chloride, 20% isooctyl acrylate, 20% ethyl acrylate, and 10% styrene was similarly polymerized to form a tetrapolymer considerably softer than that made from the 40% ethyl acrylate mixture. Both tripolymers, however, were found capable of being milled without plasticizers at temperatures of 200 to 225° F.

Interpolymers similar to those described in

Examples 1 to 8 are obtained when 10% of acrylonitrile or vinylidene chloride is polymerized along with a mixture containing 35 parts vinyl chloride, 55 parts n-octyl acrylate and 10 parts of styrene. However, since the use of most other monomers does not seem to impart additional desirable properties to the interpolymers of this invention, it is of course preferred to produce interpolymers from monomeric mixtures containing only vinyl chloride, higher alkyl acrylates, and styrene.

While the invention has been described with particular reference to certain preferred embodiments thereof, it is possible to make variations and modifications therein without departing from the spirit and scope of the invention as defined in the appended claims.

We claim:

1. An interpolymer made by polymerizing in aqueous emulsion a mixture of monomeric materials comprising from 35 to 90% by weight of vinyl chloride, from 5 to 60% by weight of an alkyl acrylate in which the alkyl group contains from 5 to 10 carbon atoms, and from 5 to 50% by weight of styrene.

2. A tripolymer made by polymerizing in aqueous emulsion a mixture of monomeric materials consisting of from 40 to 85% by weight of vinyl chloride, 10 to 50% by weight of alkyl acrylate in which the alkyl group contains a total of 8 to 10 carbon atoms and possesses a carbon chain of 6 to 10 carbon atoms, and from 5 to 35% by weight of styrene.

3. A tripolymer made by polymerizing in aqueous emulsion a monomeric mixture consisting of from 40 to 85% by weight of vinyl chloride, from 10 to 50% by weight of n-octyl acrylate, and from 5 to 35% by weight of styrene.

4. A tripolymer made by polymerizing in aqueous emulsion a mixture of monomeric material consisting of from 40 to 85% by weight of vinyl chloride, from 10 to 50% by weight of 2-ethylhexyl acrylate, and from 5 to 35% by weight of styrene.

5. A tripolymer made by polymerizing in aqueous emulsion a mixture of monomeric material consisting of from 40 to 85% by weight of vinyl chloride, from 10 to 50% by weight of iso-octyl acrylate, and from 5 to 35% by weight of styrene.

ROBERT J. WOLF.
ANTHONY A. NICOLAY.

REFERENCES CITED

The following references are of record in the file of this patent:

UNITED STATES PATENTS

| Number | Name | Date |
| --- | --- | --- |
| 2,462,422 | Plambeck | Feb. 22, 1949 |

FOREIGN PATENTS

| Number | Country | Date |
| --- | --- | --- |
| 835,357 | France | Sept. 19, 1938 |

OTHER REFERENCES

Chapin et al., article in J. Am. Chem. Soc. 70, 538–542, February 1948.

Rehberg et al., Ind. Eng. Chem., 40, 1429–1433, August 1948.